United States Patent [19]

Bond, Jr.

[11] 4,348,218
[45] Sep. 7, 1982

[54] FERTILIZER BRIQUETTE ADAPTED TO BE HAMMERED INTO THE GROUND

[75] Inventor: Allen M. Bond, Jr., Louisville, Ky.

[73] Assignee: International Spike, Inc., Lexington, Ky.

[21] Appl. No.: 909,033

[22] Filed: May 24, 1978

Related U.S. Application Data

[63] Continuation of Ser. No. 827,545, Aug. 25, 1977, abandoned, which is a continuation of Ser. No. 419,899, Nov. 28, 1973, abandoned, which is a continuation-in-part of Ser. No. 235,257, Mar. 16, 1972, abandoned.

[51] Int. Cl.$^3$ .............................................. C05C 9/00
[52] U.S. Cl. ........................................... 71/1; 71/24; 71/28; 71/903; 47/48.5; 264/326
[58] Field of Search .............. 71/24, 28, 29, 30, 64 A, 71/64 R, 64 DC, 64 SC, 64.13, 64.1, 64.4, 903; 47/48.5; 264/122, 123, 326

[56] References Cited

U.S. PATENT DOCUMENTS 3,502,548  3/1970  Schenk ..................................... 71/29
3,647,416  3/1972  Messman .......................... 71/64 SC
3,892,552  7/1975  Gay, Jr. ........................... 71/64 S X

FOREIGN PATENT DOCUMENTS 1139134  11/1962  Fed. Rep. of Germany .
1139133  5/1963  Fed. Rep. of Germany .

Primary Examiner—S. Leon Bashore, Jr.
Assistant Examiner—Ferris H. Lander
Attorney, Agent, or Firm—Hume, Clement, Brinks, Willian & Olds, Ltd.

[57] ABSTRACT

A composite granular mixture of source materials, providing an NPK Fertilizer content of desired value, say 16-8-8, and a plastic binder composed of granular uncured urea-formaldehyde resin are compressed into a briquette of good "green strength" and then resinously bonded into a drivable spike by curing the resin either at room temperature or at a suitably elevated temperature. The resulting plant food spike, when driven into the ground, functions to fertilize the immediately surrounding area at a slow even rate.

15 Claims, 1 Drawing Figure

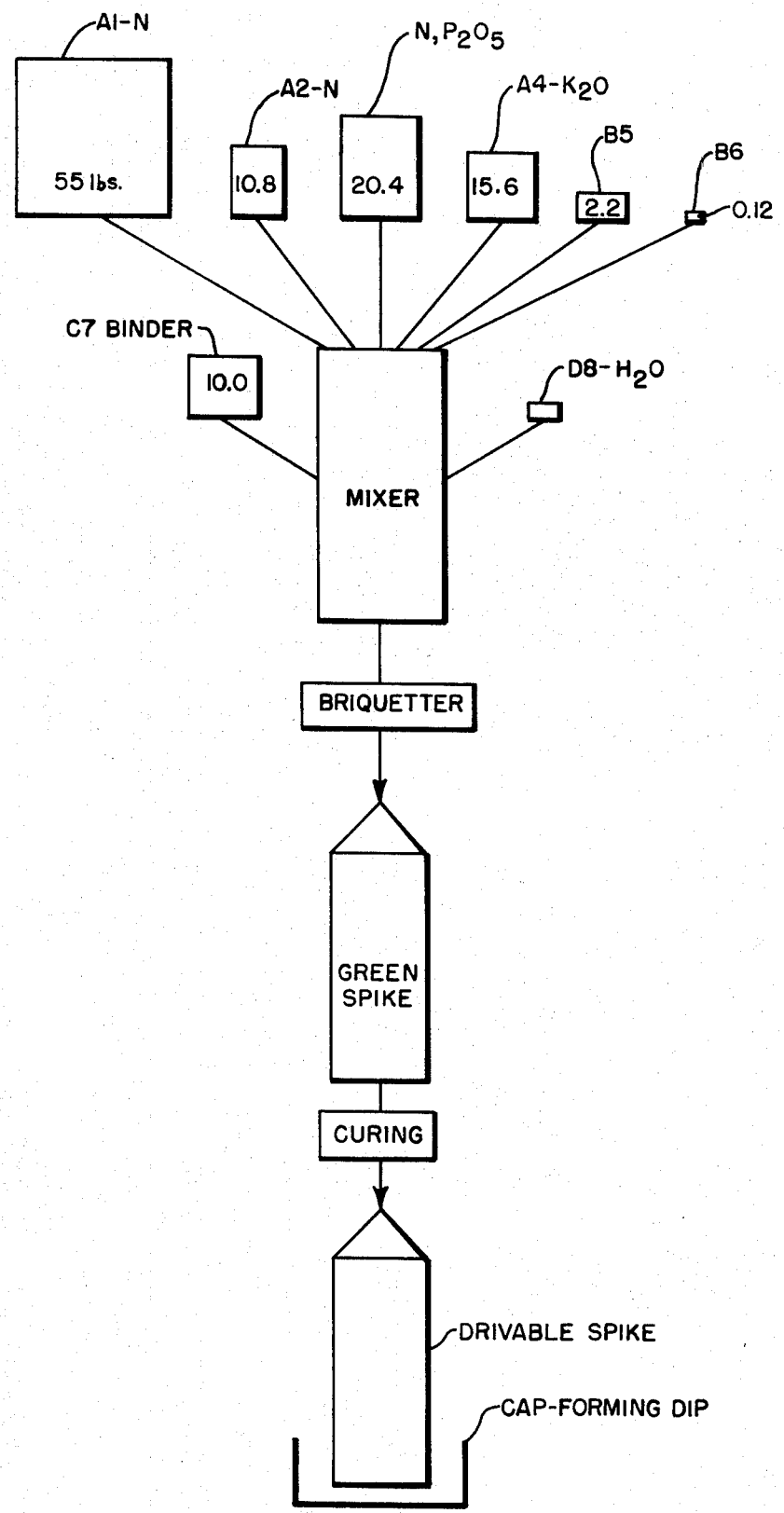

FERTILIZER BRIQUETTE ADAPTED TO BE HAMMERED INTO THE GROUND

This application is a continuation of my Ser. No. 827,545, filed Aug. 25, 1977 which was a continuation of Ser. No. 419,899, filed Nov. 28, 1973 which, in turn, was a continuation-in-part of my application Ser. No. 235,257, filed Mar. 16, 1972, all abandoned.

This invention relates to the art of making a fertilizer stick or spike which can be hammered into the ground for the purpose of providing plant nutrients to trees, bushes and the like.

The Gessler U.S. Pat. No. 3,057,713 dated Oct. 9, 1962 discloses a fertilizer stick or spike of the type intended to have a mechanical strength and impact resistance of such high order as will enable it to be driven into hard ground with a steel-headed hammer for the purpose of fertilizing trees and other like growths. Gessler's product consists essentially of (1) NPK source materials, including phosphoric acid, and (2) asbestos fiber. In the process of making the Gessler spike, the phosphoric acid reacts with the asbestos to produce a spike characterized by a relatively porous friable core surrounded by a non-porous non-friable shell. A sponge rubber or similar gasket is placed over the end of the shaped fertilizer product and a metallic cap is disposed over the gasket. However, even with this protective cap, the Gessler product is not always drivable. Moreover, it is not consistent in quality, contains a substantial amount of non-fertilizer material and is not invariably shatter-proof.

Messman discloses in U.S. Pat. No. 3,647,416 a fertilizer product having the general shape of a cold chisel. The Messman product is similar to the one disclosed by Gessler with the exception that magnesia is substituted for Gessler's asbestos. The magnesia reacts with phosphoric acid to form a binder. Ureaform, a water soluble urea-formaldehyde resin is included in the product as a source of nitrogen. The Messman composition is fashioned into the tapered product by extrusion. The Messman product has the disadvantage that the composition solidifies so rapidly after the phosphoric acid and magnesia are mixed together that it is impractical to shape it into a drivable shape on a commercial scale. The product has the additional disadvantage of containing a large amount of non-fertilizer materials such as ground coke.

In an effort to provide a fertilizer product adapted to be driven into the ground, various patentees have suggested complicated and expensive support members for the shaped fertilizer. For example, Schenk in U.S. Pat. No. 3,502,458 provides a protective cover and a rigid cap for his stake. Parry, on the other hand, in U.S. Pat. No. 3,290,821 discloses a support for his cylindrical fertilizer product to facilitate pushing the fertilizer into the ground with the foot. Such a stick-type fertilizer has the disadvantage of requiring a special device for placing it in the ground.

Other prior disclosures of the patent art include: the soil treating cartridge of Van Yahres, U.S. Pat. No. 1,971,390; the fertilizing stick of Antrim, U.S. Pat. No. 2,032,608; the fertilizing pill, pellet, stick, etc. of Jones, U.S. Pat. No. 2,117,808; and the fertilizing cylinder of Martin et al, U.S. Pat. No. 2,341,800. None of the foregoing prior art products can be rated as the equivalent of spikes adapted to be hammered into the ground.

The principal objects of the present invention are: (1) to provide an uncured or "green" fertilizer spike, which can be made of adequate NPK source materials and a resinous bonding material, all of which are relatively plentiful, inexpensive, readily mixable together and easily briquetted into the form of a "green" spike; (2) to provide a green spike which has a highly satisfactory green strength and which can be cured at room temperature in a relatively short time; and (3) to provide a cured fertilizer spike, which can be produced and shipped at a satisfactory cost, which has a good shelf life, which is not easily broken but, on the contrary, is so hard and sturdy that it can always be driven into reasonably hard ground without shattering or otherwise incurring appreciable damage, and which, in use, provides adequate fertilizer ingredients characterized by high fertilizer values and a solubility such that it yields all of its fertilizer values evenly and at slow desired rates over its useful life, which preferably endures for at least one year.

I have found that the foregoing objectives can be achieved by mixing granular or pulverulent NPK source materials with a relatively small quantity of an uncured granular thermosetting binder, such as urea-formaldehyde, compressing the mixture into the form of a green spike and then curing the spike to convert the binder into a relatively water insoluble infusible aminoplastic briquette.

The single FIGURE in the drawing is a flow diagram illustrating the process by which drivable spikes are made in accordance with the present invention and capped.

The presently preferred embodiment of the invention comprises a drivable spike, which contains 16.0 units of Nitrogen, 8.0 units of $P_2O_5$ and 8.0 units of $K_2O$, and which is produced by curing a green spike, that is obtained by processing the following formulation, viz:

| Ingredients | % Nutrients | Pounds |
|---|---|---|
| A. Fertilizer - 20 Mesh | | |
| 1. N-Ammonium Sulfate | (21-0-0) | 55.0 |
| 2. N-Urea-Form such as DuPont's "Uramite"; Borden's "38"; or Hercules'"Nitro-form" | (38-0-0) | 10.8 |
| 3. N,$P_2O_5$ - Diammonium Phosphate | (18-46-0) | 20.4 |
| 4. $K_2O$ - Potassium Chloride | (0-0-62) | 15.6 |
| B. Supplements | | |
| 5. Micronutrients typified by fritted trace elements (F.T.E.) such as those made by Ferro Corp. | (0-0-0) | 2.20 |
| 6. Pigments such as the yellow and blue dyes made by DuPont | (0-0-0) | 0.12 |
| C. Resinous Binder - 200 Mesh | | |
| 7. Urea-Formaldehyde, such as Monsanto Co.'s "UF-71" | (0-0-0) | 10.0 |
| D. Moisture | | |
| 8. $H_2O$ | (0-0-0) | 0.0-1.7 |

Since the flow diagram illustrated in the drawing is more or less self-explanatory, it should suffice to say that the above-stated formulation is processed into a final product spike by feeding the main fertilizer ingredients A 1-4 and the supplement ingredients B 5-6 into a mixer within which they are blended into a homogeneous mass as they flow therethrough. The binder ingredient C 7 (and the water ingredient C 8 when desired) may be fed into the mixer at any suitable point, the drawing showing them fed after the other ingredients have progressed through a portion of the mixing operation. Preferably, the fertilizer source materials and the binder are mulled together until the particles of source materials are coated with the binder and then charged to the mold cavity of a briquetting machine.

From the mixer, the homogeneous mixture is passed into a briquetter which compresses measured amounts of it into one solid "green" spike, one end of which preferably is blunt and the other pointed. This green spike then undergoes curing which may extend over a one day period at room temperature. The curing temperature may be elevated to decrease the curing time. However, cured, the resulting product is a hard rigid drivable spike having a mechanical strength and an impact resistance of such high order as will enable it to be driven into reasonably hard ground with a steel-headed hammer without significant shattering or other damage and preferably without any damage visible to the eye.

This drivable spike may have its blunt end dipped into a resinous cap-forming solution which will harden into a cap having sufficient impact resistance to withstand repeated blows of a steel-headed hammer when the capped spike is driven into hard ground. The cap thus contributes additional impact resistance to the final product. If desired, a removable and reusable cap may be employed for single use or repeated use purposes.

There is nothing particularly critical about the fertilizer ingredients employed or the sources from which they are derived. The above-stated amounts of NPK ingredients may be varied to change the 16:8:8 percentages to other useful percentages, such as 8:4:4, 5:5:5, 15:5:5, etc., which may be selected in order to meet particular needs or purposes. The higher concentrations of nutrients are preferred, if only to minimize the number of spikes required per tree, for example.

Likewise, selected amounts of other well known NPK source materials may be substituted in whole or in part for those mentioned above, as for example:

| N - Urea | 46-0-0 |
| --- | --- |
| Ammonium Nitrate NH$_4$NO$_3$ | 35-0-0 |
| Mono Ammonium Phosphate | 13-52-0 |
| P - Mono Ammonium Phosphate | 13-52-0 |
| Triple Super Phosphate | 0-46-0 |
| Normal Super Phosphate | 0-21-0 |
| K - Potassium Sulphate K$_2$SO$_4$ | 0-0-48 |

Secondary nutrients such as calcium, magnesium and sulphur, which are variously used by various plants in relatively large amounts, may be added, if deemed desirable or necessary but they usually are satisfactorily available in the soil. The micro-nutrients used are, of course, selected by the formulator to provide trace elements in the varieties and quantities desired. The materials selected may include one or more well known sources of iron, copper, manganese, barium, zinc and molybdenum.

The dye supplement contributes nothing more than a desired color characteristic of the spike.

While the resinous binder is a urea-formaldehyde compound, it is intended to form a relatively insoluble structure; hence, it is not intended to, or selected for its ability to, provide a significant nitrogen nutrient contribution. The amount of binder used should be no more than is necessary to provide the requisite mechanical strength. The "UF-71" binder preferred has a urea-formaldehyde ratio ranging from about 1.00 over 1.38 to about 1.00 over 1.80.

With a thermosetting resinous binder, the same as or equivalent to "UF-71", a properly prepared mixture of 7 to 10% binder and 93 to 90% of NPK containing no more than 5.0% free moisture, can be formed into a spike of highly satisfactory green strength via briquetting. The addition of water to dry ingredients may be minimized by preheating the NPK/binder mixture to a temperature which fluidizes the binder and accelerates its tendency to cure. Where the "UF-71" binder is employed, this temperature may be around 180° F.

With a free moisture content of 2.0 to 5.0% in the material flowing to the briquetting unit, a subsequent water-evaporation step is not required. The spikes thus produced are readily released from the forming tools. Each spike emerges from both the mixing and forming equipment so cleanly that it poses no problem of cleanup. It will cure satisfactorily in one day exposure to an atmosphere of 70° F. and 60.0% relative humidity. It goes without saying that this curing time can be reduced with the use of external heat such as oven, radiant or dielectric heat. The atmospheric curing of binders, typified by "UF-71", is promoted by (1) a free moisture content in the range of 2.0 to 5.0%, (2) a slight drop in pH, which is effected by certain acid-forming components in the NPK fraction, (3) the addition of small quantities of a catalyst, such as ammonium chloride, and (4) the frictional heat manifested in forming a spike under pressure.

Some water should be present in the materials used to form the green spike in order to obtain a consistently good strong atmospherically-cured product. The primary fertilizer ingredients and the binder ingredients in the preferred composition above set forth are hygroscopic. As a consequence, when exposed to humid weather conditions, they may absorb enough water from the atmosphere to insure the initial production of a curable spike of good green strength. If the dry materials (i.e. binder and nutrients) become notably dessicated, supplemental water should be added during the mixing operations to insure effective bonding. In any such case, a water addition, ranging in weight from 1½ to 2½ percent of the weight of the material fed into the briquetter, is recommended.

It has been found that a unitary hard rigid fertilizer product having a shape, mechanical strength and an impact resistance which adapts it to be hammered while unsupported into the ground without substantial shattering and having a substantially homogeneous composition consisting essentially of non-fibrous particles comprising NPK fertilizer source materials bound together by a substantially water insoluble cured thermosetting resinous binder can be prepared by a process wherein NPK fertilizer source materials and an uncured thermosetting resin, such as, for example, urea formaldehyde are mixed together such as by mulling until a substantially homogeneous mixture of the particles of NPK source material coated with uncured thermosetting resin is obtained, compacting the resulting mixture into a briquette having a blunt end adapted to be struck by a hammer and a pointed end adapted to pierce the soil, and curing the thermosetting resin into a substantially water insoluble thermoset resin. Surprisingly, the compacted product has sufficient green strength to be ejected from the briquetting die and to be handled and packaged before curing of the resin without crumbling.

While I prefer the use of a granular resinous bonding material incorporated in or mixed with the fertilizer mix before the spike-forming operation is performed, it will be understood that I may use a resinous liquid bonding material in a manner insuring a satisfactory disposition of the bonding liquid preferably throughout the mass of the spike and the retention by the spike of a sufficient but relatively small quantity of the bonding agent, say between 5 to 15% by weight. I have found that, when a liquid binder is used, the quality of the resulting spikes can be somewhat improved if such binder is uniformly distributed over the surface of the dry fertilizer particles through the agency of a suitable operation such as a mulling operation. However, many liquid binders have these undesirable characteristics, viz: they contain either water or some other solvent which must be evaporated; and they polymerize only at elevated temperature.

While I prefer fertilizer and binder ingredients of 20 and 200 mesh respectively, this is only a preference and not an essential characteristic of the present invention. Where granular materials are employed, the mesh can be determined by the formulator.

Although the invention has been described in detail for the purpose of illustration, it is to be understood that such detail is solely for that purpose and that variations can be made therein by those skilled in the art without departing from the spirit and scope of the invention except as it may be limited by the claims.

I claim:

1. A hard, rigid fertilizer product compacted by briquetting and having a shape, mechanical strength and an impact resistance which adapts it to be hammered while unsupported into the ground without significant shattering and having a substantially homogeneous composition consisting essentially of from 85% to 95% by weight substantially nonfibrous NPK fertilizer source materials bonded together by from 15% to 5% by weight of a substantially water insoluble cured thermosetting resinous binder based on the dry weight of the mixture.

2. A hard, rigid fertilizer briquette having a shape, mechanical strength and an impact resistance which adapts it to be hammered while unsupported into the ground without significant shattering and having a substantially homogeneous composition consisting essentially of 90% to 93% by weight of substantially nonfibrous NPK fertilizer source materials bound together by 7% to 10%, based on dry weight of the mixture, of a substantially water insoluble cured thermosetting urea formaldehyde resin prepared from formaldehyde and urea in a ratio of from about 1.38 to about 1.8 formaldehyde to 1 urea.

3. A hard, rigid fertilizer product compacted by briquetting a mixture of granular fertilizer source materials coated with an uncured thermosetting resin into a briquette having a mechanical strength, impact resistance and shape including a pointed end and a blunt end which adapt it to be hammered while unsupported into the ground without significant shattering and having a substantially homogeneous composition consisting essentially of granular fertilizer source materials bonded together by a substantially water insoluble binder formed by curing of the said thermosetting resin, said composition being devoid of fibrous materials and said binder providing the aforesaid mechanical strength and impact resistance and said product having a resinous cap on the blunt end.

4. A method for making a fertilizer briquette adapted to be hammered while unsupported into the ground without substantial shattering thereof which comprises:
preparing a homogeneous mixture of nonfibrous particles comprising pulverulent, granular NPK fertilizer source materials and an uncured thermosetting urea formaldehyde resinous binder by mulling together said source materials and said binder until the said source materials are coated with the binder;
charging the resulting mixture into the mold cavity of a briquetter; then
compacting said mixture into a briquette having a shape which adapts it to be hammered into the ground and a green strength which permits it to be handled without substantial crumbling, said green briquette having a blunt end;
curing the resinous binder into a substantially water insoluble thermoset resin to form a rigid fertilizer briquette having a shape, mechanical strength and impact resistance which adapts it to be hammered while unsupported into the ground without significant shattering; and
dipping the blunt end in a solution of a resin to form a cap thereon.

5. The fertilizer briquette made by the process of claim 4.

6. A method for making a fertilizer spike-shaped briquette, said method comprising:
mixing a granular NPK source material with an uncured thermosetting binder to form a mixture;
compressing said mixture at a pressure capable of forming without the need for additional heat a solid green spike having a sufficient strength to be ejected from the die and maintain its shape; and then
allowing the binder in the spike to completely cure so as to form a hard rigid spike drivable into the ground by a hammer without significant shattering.

7. The method of claim 6 wherein the binder is allowed to cure at room temperature.

8. The method of claim 6 wherein the binder is allowed to cure at atmospheric conditions.

9. The method of claim 6 wherein the proportion of the binder in said mixture is from about 5 to 15 weight percent and the proportion of moisture is less than 5 weight percent.

10. The method of claim 6 wherein the binder is urea formaldehyde.

11. The method of claim 10 wherein the proportion of the binder in said mixture is from about 7 to 10 weight percent.

12. The method of claim 10 wherein the binder has a urea-formaldehyde ratio ranging from about 1.00 over 1.38 to about 1.00 over 1.80.

13. The method of claim 10 wherein the mixture includes less than 5 weight percent of moisture.

14. The method of claim 10 wherein the mixture includes from about 2 to about 5 weight percent moisture.

15. A method for making a fertilizer spike-shaped briquette, said method comprising:
mixing a granular NPK source material with uncured urea formaldehyde to form a mixture;
subjecting said mixture to compression by a briquetter at a pressure capable of forming, without the need for additional heat, a solid green spike having a sufficient strength to be ejected from the briquetting die and maintain its shape; then,
allowing the binder in the spike to completely cure so as to form a hard rigid spike drivable into the ground by a hammer without significant shattering.

* * * * *